(12) United States Patent
Hakansson et al.

(10) Patent No.: US 9,409,382 B2
(45) Date of Patent: Aug. 9, 2016

(54) METHOD OF PRODUCING A BUILDING PANEL

(71) Applicant: Ceraloc Innovation AB, Viken (SE)

(72) Inventors: Niclas Hakansson, Viken (SE); Jan Jacobsson, Landskrona (SE); Marcus Bergelin, Lerberget (SE); Rickard Rittinge, Viken (SE); Melker Ryberg, Malmo (SE); Goran Ziegler, Viken (SE)

(73) Assignee: VALINGE INNOVATION AB, Viken (SE)

( * ) Notice: Subject to any disclaimer, the term of this patent is extended or adjusted under 35 U.S.C. 154(b) by 122 days.

(21) Appl. No.: 14/091,957

(22) Filed: Nov. 27, 2013

(65) Prior Publication Data

US 2014/0144583 A1    May 29, 2014

Related U.S. Application Data

(60) Provisional application No. 61/730,699, filed on Nov. 28, 2012.

(51) Int. Cl.
*B32B 38/14* (2006.01)
*B32B 37/14* (2006.01)
*B32B 37/10* (2006.01)
(Continued)

(52) U.S. Cl.
CPC ............... *B32B 38/145* (2013.01); *B32B 37/14* (2013.01); *B32B 37/24* (2013.01); *B32B 2471/00* (2013.01); *B32B 2607/00* (2013.01); *E04F 15/107* (2013.01); *E04F 2290/04* (2013.01)

(58) Field of Classification Search
CPC ............. B32B 2471/00; B32B 38/145; B32B 2607/00; B32B 37/14; B32B 37/24; E04F 15/107; E04F 2290/04
USPC ........................................................ 52/311.1
See application file for complete search history.

(56) References Cited

U.S. PATENT DOCUMENTS 3,210,302 A * 10/1965 Bowell .................. C08G 18/36
524/157
5,141,599 A    8/1992 Jahn et al.
(Continued)

FOREIGN PATENT DOCUMENTS

CN           101885200 A    11/2010
DE    10 2010 045 266 A     3/2012
(Continued)

OTHER PUBLICATIONS

Written Opinion of WO2014084787; Oct. 3, 2014.*
(Continued)

*Primary Examiner* — Sonya Mazumdar
(74) *Attorney, Agent, or Firm* — Buchanan Ingersoll & Rooney P.C.

(57) ABSTRACT

A method of producing a floor panel (1), including providing a carrier (3) including a thermoplastic material, applying a primer comprising at least one salt, preferably a metal salt, on a first surface of the carrier (3), printing by means of digital printing a first print (10) on said first surface of the carrier (3) with an aqueous pigment ink composition, and applying a protective layer (4) on said first surface of the carrier (3) and applying the carrier (3) on a core (2) and pressing by applying heat and pressure the protective layer (4), the carrier (3) and the core (2) together to form a floor panel (1). Also, a method for forming a decorative substrate.

30 Claims, 4 Drawing Sheets (51) Int. Cl.
*E04F 13/00* (2006.01)
*B32B 38/00* (2006.01)
*B32B 37/24* (2006.01)
*E04F 15/10* (2006.01)

(56) References Cited

U.S. PATENT DOCUMENTS

| | | | |
|---|---|---|---|
| 5,486,231 | A | 1/1996 | Dulaney |
| 6,087,416 | A | 7/2000 | Pearlstine et al. |
| 6,310,115 | B1 | 10/2001 | Vanmaele et al. |
| 6,565,919 | B1 | 5/2003 | Hansson |
| 6,585,369 | B1 | 7/2003 | Sievert et al. |
| 6,800,340 | B1 | 10/2004 | Francescutti |
| 2002/0061389 | A1 | 5/2002 | Brooker et al. |
| 2003/0207083 | A1 | 11/2003 | Hansson et al. |
| 2004/0061753 | A1 | 4/2004 | Chen |
| 2004/0191547 | A1 | 9/2004 | Oldorff |
| 2004/0250911 | A1 | 12/2004 | Vogel |
| 2005/0193677 | A1 | 9/2005 | Vogel |
| 2005/0249929 | A1 | 11/2005 | Reichwein et al. |
| 2007/0224438 | A1 | 9/2007 | Van Benthem et al. |
| 2008/0048388 | A1 | 2/2008 | Gauss et al. |
| 2008/0152825 | A1 | 6/2008 | Mukai et al. |
| 2008/0152877 | A1 | 6/2008 | Mukai |
| 2008/0176039 | A1 | 7/2008 | Chen et al. |
| 2008/0252709 | A1 | 10/2008 | Ushiku |
| 2010/0091058 | A1 | 4/2010 | Hale et al. |
| 2010/0196678 | A1 | 8/2010 | Vermeulen |
| 2010/0300030 | A1 | 12/2010 | Pervan et al. |
| 2010/0307675 | A1 | 12/2010 | Buhlmann |
| 2010/0323187 | A1 | 12/2010 | Kalwa |
| 2011/0177354 | A1 | 7/2011 | Ziegler et al. |
| 2011/0180202 | A1 | 7/2011 | Hirst et al. |
| 2011/0189448 | A1 | 8/2011 | Lindgren et al. |
| 2011/0234727 | A1 | 9/2011 | Aoki et al. |
| 2012/0015107 | A1 | 1/2012 | Schacht et al. |
| 2012/0113193 | A1 | 5/2012 | Yamashita |
| 2012/0147108 | A1 | 6/2012 | Ganapathiappan et al. |
| 2012/0169808 | A1 | 7/2012 | Kiyomoto et al. |
| 2012/0249705 | A1 | 10/2012 | Aoki et al. |
| 2012/0288689 | A1 | 11/2012 | Hansson et al. |
| 2013/0063528 | A1 | 3/2013 | Govyadinov |
| 2013/0286088 | A1 | 10/2013 | Jacobsson |
| 2014/0017452 | A1 | 1/2014 | Pervan |
| 2014/0186610 | A1 | 7/2014 | Pervan |
| 2015/0210055 | A1 | 7/2015 | Pervan |
| 2015/0218395 | A1 | 8/2015 | Pervan |

FOREIGN PATENT DOCUMENTS

| | | |
|---|---|---|
| EP | 1 328 407 | 5/2002 |
| EP | 1 242 702 A1 | 9/2002 |
| EP | 1 314 766 A1 | 5/2003 |
| EP | 1 403 343 A1 | 3/2004 |
| EP | 1 454 763 A2 | 9/2004 |
| EP | 1 242 702 B1 | 11/2004 |
| EP | 1 584 378 A1 | 10/2005 |
| EP | 1 328 407 B1 | 8/2008 |
| EP | 1 980 598 A1 | 10/2008 |
| EP | 1 454 763 B1 | 8/2009 |
| EP | 2 202 056 A1 | 6/2010 |
| EP | 2 213 476 A1 | 8/2010 |
| EP | 2 264 259 A2 | 12/2010 |
| EP | 2 313 281 A1 | 4/2011 |
| EP | 2 313 281 B1 | 7/2012 |
| JP | 2006-281538 A | 10/2006 |
| JP | 2008-265229 A | 11/2008 |
| WO | WO 01/19618 A1 | 3/2001 |
| WO | WO 01/47717 A1 | 7/2001 |
| WO | WO 01/48333 A1 | 7/2001 |
| WO | WO 02/42087 A2 | 5/2002 |
| WO | WO 02/42087 A3 | 5/2002 |
| WO | WO 2004/042168 A1 | 5/2004 |
| WO | WO 2005/097874 A2 | 10/2005 |
| WO | WO 2006/001880 A2 | 1/2006 |
| WO | WO 2006/106931 A1 | 10/2006 |
| WO | WO 2007/015669 A2 | 2/2007 |
| WO | WO 2009/018260 A1 | 2/2009 |
| WO | WO 2009/065769 A2 | 5/2009 |
| WO | WO 2009/065769 A3 | 5/2009 |
| WO | WO 2009/080813 A1 | 7/2009 |
| WO | WO 2009/124704 A1 | 10/2009 |
| WO | WO 2011/020755 A1 | 2/2011 |
| WO | WO 2011/087422 A1 | 7/2011 |
| WO | WO 2011/087423 A1 | 7/2011 |
| WO | WO 2011/103641 A1 | 9/2011 |
| WO | WO 2011/141849 A2 | 11/2011 |
| WO | WO 2011/141849 A3 | 11/2011 |
| WO | WO 2011/146149 A1 | 11/2011 |
| WO | WO 2012/004701 A2 | 1/2012 |
| WO | WO 2013/032387 A1 | 3/2013 |
| WO | WO 2014/011110 A1 | 1/2014 |
| WO | WO 2014/027179 A1 | 2/2014 |
| WO | WO 2014/084787 A1 | 6/2014 |

OTHER PUBLICATIONS

English translation of JP2006281538; Oct. 2006.*
English translation of JP2006-281538.*
Written Opinion of PCT/SE2013/051401.*
Pervan, Darko, U.S. Appl. No. 14/602,581 entitled "Digital Print with Water-Based Ink on Panel Surfaces," filed in the U.S. Patent and Trademark Office Jan. 22, 2015.
Pervan, Darko, U.S. Appl. No. 14/610,256 entitled "Digital Print with Water-Based Ink," filed in the U.S. Patent and Trademark Office Jan. 30, 2015.
U.S. Appl. No. 14/237,617, Pervan.
Pervan, Darko, U.S. Appl. No. 14/237,617, entitles "Panel Coating," filed in the U.S. Patent and Trademark Office on Feb. 7, 2014.
International Search Report issued in corresponding PCT/SE2013/051401, Mar. 11, 2014, ISA/SE, Stockholm, SE, 4 pages.
Pervan, Darko, U.S. Appl. No. 15/028,873 entitled "Method of Forming a Decorative Wear Resistant Layer," filed in the U.S. Patent and Trademark office on Apr. 12, 2016.

* cited by examiner

METHOD OF PRODUCING A BUILDING PANEL

CROSS REFERENCE TO RELATED APPLICATIONS

The present application claims the benefit of U.S. Provisional Application No. 61/730,699, filed on Nov. 28, 2012. The entire contents of U.S. Provisional Application No. 61/730,699 are hereby incorporated herein by reference in their entirety.

FIELD OF THE INVENTION

The present disclosure relates to a method of producing a building panel comprising a core and a printed carrier of a thermoplastic material forming a décor layer. The disclosure also relates to a method of forming a decorative substrate.

TECHNICAL BACKGROUND

In recent years, so-called Luxury Vinyl Tiles and Planks (LVT) have gained increasing success. These types of floor panels usually comprise a thermoplastic core, a thermoplastic décor layer arranged on the core, a protective layer on the décor layer, and a coating applied on the protective layer. The thermoplastic material is often PVC. The décor layer is printed with a pattern resembling natural stone, wood, ceramics etc. The pattern is often printed by rotogravure printing or direct printing. However, rotogravure printing or direct printing does not offer the desired flexibility in changing design of the patterns and adapting patterns for different needs of clients. Furthermore, a certain repetition of the pattern cannot be avoided by rotogravure printing or direct printing.

Recently, digital printing has offered new possibilities to the flooring industry to customize decorative patterns for flooring applications and to print small quantities of décor layers. By digital printing is conventionally meant printing by means of non-contact printing, for example using a Drop-on-Demand (DOD) technique. A drop of ink is placed with great accuracy on a paper or wood surface. Examples of DOD techniques are piezoelectric DOD inkjet and thermal DOD inkjet. In a piezoelectric DOD inkjet printer, the piezoelectric material changes shape when a voltage is applied. The change of shape of the piezoelectric material generates a pressure pulse in the fluid, thereby ejecting a droplet of ink from the nozzle. In a thermal DOD inkjet printer, ink drops are ejected by forming an ink vapour bubble by heating the ink.

Different kind of inks may be used for digital printing, such as UV curable inks, solvent based inks and aqueous inks (also called waterborne or water based inks). When printing on a thermoplastic surface such as a layer adapted to from a décor layer of a LVT, printing is facilitated by using UV curable inks or solvent based inks compared to aqueous inks. Printing with an aqueous ink on a thermoplastic surface has proved to be difficult. A drop of an aqueous ink does not stay but tends to bleed on the thermoplastic surface, resulting in a print of low quality. However, due to environmental reasons, it is favourable to replace UV curable inks and solvent based inks.

When the floor panel is assembled, the protective layer is bonded to the thermoplastic décor layer. It is thus important that the print does not affect the bonding between the layers adversely.

SUMMARY

It is an object of at least certain embodiments of the present invention to provide an improvement or at least an alternative over the above described techniques and known art.

A further object of at least certain embodiments of the present invention is to provide a method for producing a building panel comprising a thermoplastic décor layer including printing with an aqueous pigment ink composition.

A further object of at least certain embodiments of the present invention is to provide an improved print with an aqueous pigment ink on a thermoplastic material.

A further object of at least certain embodiments of the present invention is to reduce bleeding of an aqueous pigment ink on a thermoplastic material.

A further object of at least certain embodiments of the present invention is to provide an improved print with an aqueous pigment ink on a thermoplastic material without negatively affecting the bonding of the printed thermoplastic surface to another layer such as a protective layer arranged on the printed surface.

At least some of these and other objects and advantages that will be apparent from the description have been achieved by a method of producing a building panel such as a floor panel, comprising providing a carrier comprising a thermoplastic material, applying a primer comprising at least one salt, preferably a metal salt, on a first surface of the carrier, printing by means of digital printing a first print on said first surface of the carrier with an aqueous pigment ink composition, and applying a protective layer on the carrier and applying the carrier on a core, and pressing by applying heat and pressure the protective layer, the carrier and the core together to form a building panel.

In the building panel, the printed carrier forms a décor layer of the floor panel. Preferably, the protective layer is arranged on the first surface of the carrier. Preferably, a second surface of the carrier is facing the core.

Aqueous inks may also be called water based or waterborne inks.

The building panel may be a floor panel. The floor panel may be of the type usually named Luxury Vinyl Tile (LVT) or Luxury Vinyl Plank.

According to aspects of the invention, the core may comprise thermoplastic material. The core may be formed of a different material than a thermoplastic material, for example a wood-based material such as MDF or HDF. The core may comprise a layer comprising a thermoplastic material arranged on a substrate, for example a wood-based substrate such as MDF or HDF.

By at least certain embodiments of the inventive method, it is possible to create advanced designs of the décor layer in a more flexible and less expensive way compared rotogravure printing or direct printing. The design of the print can be customized and repetition of the pattern can be avoided.

An advantage is that an aqueous ink composition can be used also when printing on a carrier of thermoplastic material. When printing with an aqueous ink composition without any primer applied to the surface before printing, the inks drops tend to displace on the surface of the carrier and tend to mix into each other, thus resulting in a print of bad quality and a print being indistinct.

The primer is in one embodiment adapted to change the properties of the surface of the carrier such that the surface becomes more suitable for printing with an aqueous pigment ink composition. The primer may for example be adapted to increase the wettability of the surface of the carrier such that the surface of the carrier obtains hydrophilic properties.

The primer comprises at least one salt, preferably an inorganic salt, more preferably a metal salt. The salt may be a polyvalent metal salt.

The primer preferably forms a layer of uniformly distributed salt crystals on the surface of the carrier. Preferably, the primer is coalescent and/or film forming.

The primer comprising the salt is adapted to crash the ink composition. The salt of the primer precipitates or agglomerates the pigment of the ink composition. The salt reacts with the aqueous ink composition such that the pigment of the ink composition precipitates. By crashing the aqueous pigment ink composition, the ink drops are fixed at the position on the carrier where the ink drops are placed by the nozzle. By crashing the aqueous pigment ink composition, the ink drops are prevented from being mixed with each other. The primer makes the ink drops stay on the position where the ink drops are applied on the surface of the carrier. The primer prevents the ink drops from accumulating and mixing into large ink drops. The primer prevents the ink drops from moving on the surface of the carrier. Thereby, it is possible to print with an aqueous pigment ink composition on a thermoplastic surface. Furthermore, by applying the primer before printing, a print of high quality made by digital printing with an aqueous pigment ink composition can be obtained. Thereby, it is possible to produce a building panel such as a floor panel of LVT type having a print of high quality obtained in an environmentally friendly way.

Furthermore, using a primer comprising salt does not adversely affect, or at least substantially adversely affect, the bonding of the printed carrier to the protective layer when applying heat and pressure to form the building panel. The primer and the print do not reduce, or at least substantially reduce, the bonding strength between the layers. Thereby, the desired bonding between the carrier and the protective layer is still achieved.

Furthermore, the print is not affected, or at least substantially affected, by pressing the layers together for forming a building panel such as a floor panel by applying heat and pressure. The primer has already agglomerated the ink such that the ink drops are fixed on the carrier and not affected by the pressing.

The primer may be an aqueous solution comprising said at least one salt. The primer is applied prior to printing the print. The composition of the primer may be adapted to match the composition of the ink. The primer may be applied as a coating layer on the carrier. Alternatively, the primer does not completely cover the surface of the carrier. The primer may be applied to parts of the surface of the carrier. For example, if only a portion of the carrier is to be printed, such as a second print is to be printed on an already printed surface, the primer is only applied to this portion of the carrier.

The primer may be applied by means of digital printing. Thereby, application of the primer may be controlled with high accuracy. For example, by applying the primer to only certain areas of the carrier, bleeding of the ink may be controlled in order to obtained a desired effect.

The primer may be an aqueous solution comprising said salt.

The salt concentration of the primer may be at least 50% of the saturation point of the salt, preferably at least 70% of the saturation point of the salt, more preferably at least 90% of the saturation point of the salt. In one embodiment, the primer is a nearly saturated salt dispersion. The primer may be heated to a temperature above room temperature, for example to 40-60° C.

The primer applied on the carrier may have a contact angle with water of less than 50°, preferably less than 40°, more preferably less than 35°, such that about 30°. By decreasing the contact angle, spreading of the primer, and thereby the salt of the primer, on the surface of the carrier is improved. Thereby, the salt is uniformly distributed on the surface such that a uniform base for the ink is formed.

The primer may comprise a wetting agent. The wetting agent increases the wettability of the surface of the carrier. Wetting of the surface is thereby facilitated. The wetting agent of the primer results in that the surface of the carrier coated by the primer obtains hydrophilic properties. By increasing the wetting of the surface, the salt crystals are homogenously distributed over the surface of the carrier, which improves the print result. The wetting agent does not adversely affect the bonding of the printed carrier to the protective layer.

The wetting agent may be a non-ionic surfactant. The primer may as an example comprise about 0.5-4% wt of the wetting agent, preferably 1-4% wt such as about 2% wt. The type and amount of wetting agent may be adapted to the surface tension of the carrier.

The primer may be applied by means of digital printing. Thereby, application of the primer may be controlled with high accuracy. For example, by applying the primer to only certain areas of the carrier, bleeding of the ink may be controlled in order to obtained a desired effect.

The method may further comprise drying the primer applied on the first surface of the carrier prior to printing. Alternatively, printing in a wet primer may also be possible, depending on the primer used.

More than one layer of a primer may also be applied to the surface of the carrier. The step of applying the primer may comprise applying a primer, drying the applied primer, applying an additional layer of the primer, and drying the applied primer prior to printing. By applying more than one layer of the primer, coating the surface of the carrier by the primer is facilitated.

In one embodiment, the salt is applied on the carrier in solid form. Preferably, the solid salt crystals are uniformly distributed over the surface of the carrier. The solid salt crystals may be attached to the surface of the carrier in several ways. In one embodiment, the carrier is heated prior and/or during the salt is applied in solid form. In one embodiment, the carrier is electrically charged such that the surface of the carrier attracts the salt particles. In one embodiment, a plasticizer is applied to the surface of the carrier. The solid salt particles are applied to the plasticized surface of the carrier. In one embodiment, the solid salt particles are mechanically attached to the surface of the carrier. For example, the surface of the carrier may be porous in order to facilitate the bonding of the salt particles to the surface of the carrier.

The aqueous pigment ink composition may be a heat activated curing ink. A heat activated curing ink cures when being exposed to heat. When applying heat to the ink composition, the binder in the ink composition cures and the ink is thereby fixed to the surface. When the binder has cured, bleeding of the ink is reduced. By using a heat activated curing ink instead of UV curing ink, a more environmentally friendly process is obtained.

The aqueous pigment ink composition may comprise a binder, water and a pigment. The binder may be dispersed in the ink composition. The binder may be a polymer or cellulose. Alternatively, the pigment may be coated with a binder, preferably a polymer. The pigment may be dispersed in the ink composition.

The method may further comprise applying heat to the print. By applying heat, the binder of the aqueous ink composition cures. Furthermore, the heat makes the aqueous ink composition dry faster. As an alternative or complement, the carrier may also be heated before and/or during printing on the surface of the carrier.

The printing may be made by an inkjet printer, preferably a piezo-electric DOD (Drop on Demand) inkjet printer.

The surface of the carrier may be pre-treated by corona, flaming or plasma. Corona, plasma and flaming treating the surface of the carrier enhances the chemical bonding to the resin matrix in the carrier. Thereby, bonding of the ink to the carrier is improved. Corona, flaming or plasma treatment increases the wettability of the surface of the carrier. Corona, flaming or plasma treatment may be combined with applying a primer after corona, flaming or plasma treatment.

The first surface of the carrier may be facing the core. The print is thereby printed at a lower surface of the carrier.

The first surface of the carrier may be facing away from the core. The print is thereby printed at an upper surface of the carrier.

The method may further comprise printing a second print by means of digital printing on a second surface of the carrier. Consequently, the carrier is provided with a print on both its surfaces. Same pattern or design may be printed on both surfaces of the carrier. Alternatively, the print or design may be different. The first and second print may together form a specific design.

The method may further comprise printing a second print by means of digital print on the first print. The first and second print may be the same design or pattern. Alternatively, the first and second print may differ. The first and second print may together form a specific design.

The method may further comprise arranging an additional carrier on the first carrier, and printing by means of digital printing a second print on a surface of the second carrier.

The method may further comprise applying decorative elements on the carrier. The decorative elements may for example be mineral particles, plastic particles, glass particles, coloured fibres, or mother of pearl, creating a decorative effect. The mineral particles may be Granostar® or similar. The decorative elements may be solid particles, preferably having a size exceeding 1 μm.

The protective layer may comprise a thermoplastic material such as polyvinyl chloride (PVC), polyester, polypropylene (PP), polyethylene (PE), polystyrene (PS), polyurethane (PUR), polyethylene terephthalate (PET), polyacrylate, polyvinyl butyral, or a combination thereof. The protective layer may be provided with a coating, preferably a UV curable coating, more preferably a coating comprising acrylate oligomers, methacrylate oligomers, or unsaturated polyester. It is also contemplated that only a coating forming a protective layer is applied on the carrier forming the décor layer.

The thermoplastic material of the carrier may be polyvinyl chloride (PVC), polyester, polypropylene (PP), polyethylene (PE), polystyrene (PS), polyurethane (PUR), polyethylene terephthalate (PET), polyacrylate, polyvinyl butyral, or a combination thereof. The thermoplastic material of the core may be polyvinyl chloride (PVC) or polypropylene (PP). The thermoplastic core may be a Wood Plastic Composite (WPC).

The method may further comprise pressing the core, the carrier having the print thereon and the protective layer with an embossed press plate. Thereby, a building panel having an embossed structure is formed.

The method may further comprise forming a mechanical locking system for horizontal and/or vertical locking of adjacent building panels at at least one edge of the building panel.

According to a second aspect of the invention, a building panel such as a floor panel is provided. The building panel comprises a core comprising a thermoplastic material, a printed décor layer comprising a thermoplastic material, and a protective layer arranged on the printed décor layer, wherein the décor layer is provided with a primer layer arranged on a surface of the décor layer and a print is arranged on the primer layer, wherein the print comprises an aqueous pigment ink composition and the primer layer comprises salt, preferably a metal salt.

The aqueous pigment ink composition may be a heat activated curing ink. The metal salt may be a polyvalent metal salt.

According to a third aspect of the invention, a method for forming a decorative substrate is provided. The method comprises providing a carrier comprising a thermoplastic material, applying a primer comprising at least one salt, preferably a metal salt, on a first surface of the carrier, printing, preferably by digital printing, a first print on said first surface of the carrier with an aqueous pigment ink composition, applying a protective layer comprising a thermoplastic material on the first surface of the carrier, pressing the protective layer and the carrier together to form a decorative substrate.

An embodiment according to the third aspect of the invention incorporates all the advantages of the first aspect of the invention, which previously has been discussed, whereby the previous discussion is applicable also for the method according to the third aspect.

For example, the primer comprising the salt is adapted to crash the ink composition. The salt of the primer precipitates or agglomerates the pigment of the ink composition. The salt reacts with the aqueous ink composition such that the pigment of the ink composition precipitates. By crashing the aqueous pigment ink composition, the ink drops are fixed at the position on the carrier where the ink drops are placed by the nozzle. By crashing the aqueous pigment ink composition, the ink drops are prevented from being mixed with each other. The primer makes the ink drops stay on the position where the ink drops are applied on the surface of the carrier. The primer prevents the ink drops from accumulating and mixing into large ink drops. The primer prevents the ink drops from moving on the surface of the carrier. Thereby, it is possible to print with an aqueous pigment ink composition on a thermoplastic surface. Furthermore, by applying the primer before printing, a print of high quality made by digital printing with an aqueous pigment ink composition can be obtained. Thereby, it is possible to produce a floor panel of LVT type having a print of high quality obtained in an environmentally friendly way.

Furthermore, using a primer comprising salt does not adversely affect, or at least substantially adversely affect, the bonding of the printed carrier to the protective layer when applying heat and pressure to form the building panel. The primer and the print do not reduce, or at least substantially reduce, the bonding strength between the layers. Thereby, the desired bonding between the carrier and the protective layer is still achieved.

Furthermore, the print is not affected, or at least not substantially affected, by pressing the layers together for forming a building panel by applying heat and pressure. The primer has already agglomerated the ink such that the ink drops are fixed on the carrier and not affected by the pressing.

Pressing may be performed by applying heat and pressure. By applying heat pressure, the carrier with the print and the protective layer are bonded together. The decorative substrate may be bonded to a core. The core may, for example, comprise a thermoplastic material, or a wood-based material such as MDF or HDF.

The salt may be applied on the carrier in solid form.

The primer may be an aqueous solution comprising said salt.

The salt concentration of the primer may be at least 50% of the saturation point of the salt, preferably at least 70% of the saturation point of the salt, more preferably at least 90% of the saturation point of the salt.

The primer applied on the carrier may have a contact angle of less than 50°, preferably less than 40°, more preferably less than 35°, such that about 30°.

The primer may comprise a wetting agent. The primer may as an example comprise 0.5-4% wt of the wetting agent, preferably 1-4% wt such as about 2% wt. The wetting agent may comprise a non-ionic surfactant.

The primer may be applied by means of digital printing.

The method may further comprise drying the primer applied on the first surface of the carrier prior to printing.

The aqueous pigment ink composition may be a heat activated curing ink.

The aqueous pigment ink composition may comprise a binder, water and a pigment.

The method may further comprise applying heat to the print.

The printing may be made by an inkjet printer, preferably a piezo-electric DOD (Drop on Demand) inkjet printer.

The protective layer may comprise a thermoplastic material such as polyvinyl chloride (PVC), polyester, polypropylene (PP), polyethylene (PE), polystyrene (PS), polyurethane (PUR), or polyethylene terephthalate (PET), polyacrylate, polyvinyl butyral, or a combination thereof.

The thermoplastic material of the carrier may be polyvinyl chloride (PVC), polyester, polypropylene (PP), polyethylene (PE), polystyrene (PS), polyurethane (PUR), or polyethylene terephthalate (PET), polyacrylate, polyvinyl butyral, or a combination thereof.

BRIEF DESCRIPTION OF THE DRAWINGS

The present invention will by way of example be described in more detail with reference to the appended schematic drawings, which show embodiments of the present invention.

FIG. 3c illustrates a top view of the printing line in FIG. 3a.

DETAILED DESCRIPTION

A building panel such as a floor panel 1 according to an embodiment of the present invention will now be described with reference to FIG. 1 and FIGS. 2a-d. The floor panel 1 comprises a core 2, a carrier 3 provided with a print forming a décor layer 6, and a protective layer 4. The core 2, the carrier 3 and the protective layer 4 are bonded together to form the floor panel 1. The floor panel 1 may also be provided with a backing layer (not shown) arranged on the lower surface of the core 2. A coating 5 may be provided on top of the protective layer 4.

Figure 1:
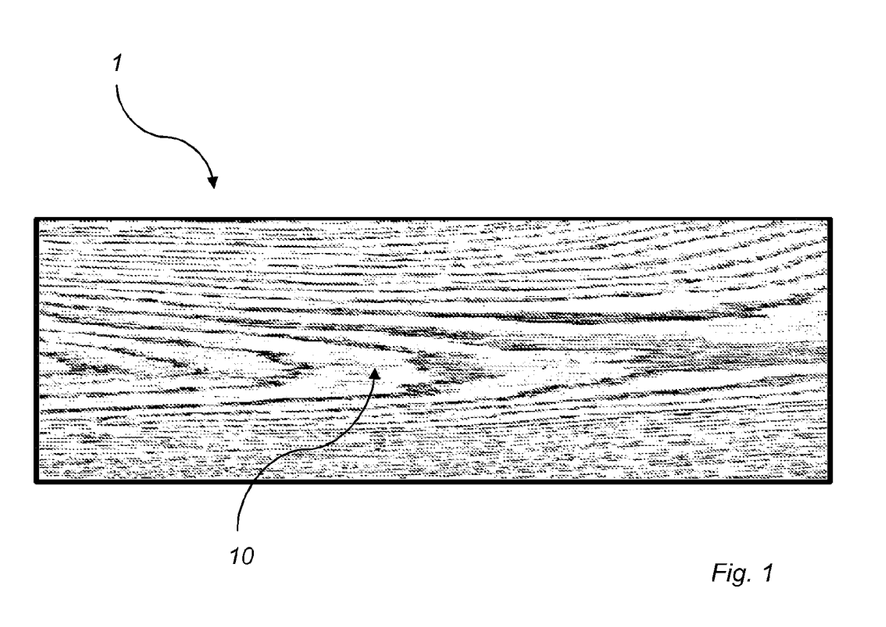
FIG. 1 illustrates a top view of an embodiment of a building panel such as a floor panel.
Figure 2A:
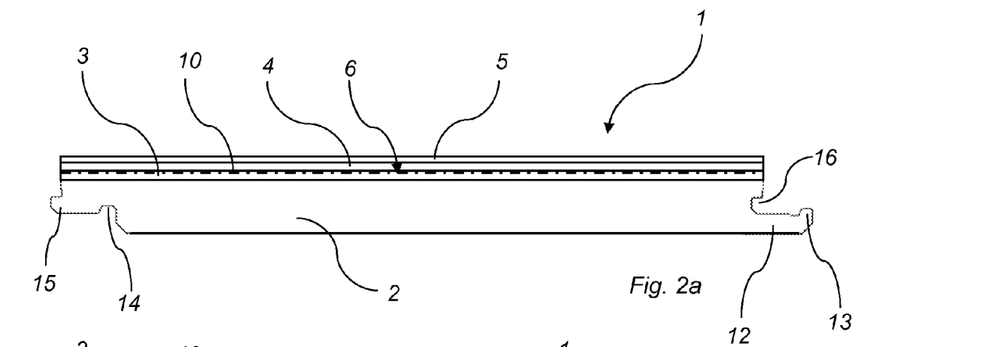
FIG. 2a illustrates a cross-section of an embodiment of a building panel such as a floor panel.

The core 2 comprises a thermoplastic material. The thermoplastic material may be polyvinyl chloride (PVC) or polypropylene (PP). The core 2 may further comprise fillers, for example calcium carbonate, and additives such as plasticizer, impact modifier, stabilizer, processing aids, pigment, lubricants etc. Alternatively, the core may be a Wood Plastic Composite (WPC) comprising a thermoplastic binder and wood fibres or particles.

The core 2 may also comprise more than one layer. The layers may be of similar or different material. The core 2 may comprise several layers comprising a thermoplastic material, or may comprise at least one layer comprising a thermoplastic material arranged on a substrate of, for example, a wood based material such as MDF or HDF.

The carrier 3 comprises a thermoplastic material such as polyvinyl chloride (PVC), polyester, polypropylene (PP), polyethylene (PE), polystyrene (PS), polyurethane (PUR), polyethylene terephthalate (PET), polyacrylate, polyvinyl butyral, or a combination thereof. The carrier may further comprise additives such as a plasticizer. The carrier 3 may be in form of a thermoplastic foil or film. The thickness of the carrier 3 may be 0.01-1 mm. The carrier 3 may be transparent, coloured or opaque. The colour of the carrier 3 may form a base colour for the print.

The protective layer 4 is arranged on the carrier 3. The protective layer 4 is bonded to the carrier 3. The protective layer 4 may be in form of a thermoplastic foil or film. The protective layer 4 comprises a thermoplastic material such as polyvinyl chloride (PVC), polyester, polypropylene (PP), polyethylene (PE), polystyrene (PS), polyurethane (PUR), polyethylene terephthalate (PET), polyacrylate, polyvinyl butyral, or a combination thereof. The protective layer 4 may further comprise additives such as a plasticizer. The thickness of the protective layer 4 may be 0.01-1 mm. Wear resistant particles such as aluminium oxide particles may be included in the protective layer 4. The protective layer 4 is preferably transparent.

A coating 5 may be arranged on the protective layer 4. The coating 5 is preferably a UV curable coating, more preferably a coating comprising an acrylate oligomer, methacrylate oligomer, or unsaturated polyester.

In an alternative embodiment, the protective layer 4 is formed by the coating applied directly on the printed carrier 3 forming the décor layer 6.

The floor panel 1 may be provided with a backing layer (not shown) on the lower surface of the core. The backing layer may comprise a thermoplastic material such as polyvinyl chloride (PVC), polyester, polypropylene (PP), polyethylene (PE), polystyrene (PS), polyurethane (PUR), or polyethylene terephthalate (PET).

The carrier 3 is provided with a print 10 giving the carrier its decorative properties. The printed carrier 3 forms a décor layer 6. The print 10 may be a decorative design. The decorative design may be natural designs and patterns such as a wood pattern or stone pattern. The decorative design may also be a fantasy design or pattern or a photograph.

The print is applied to a primer layer comprising at least one salt, preferably a metal salt. The salt crystals form a primer layer onto which the pigments of the ink are injected. The salt crystals preferably form a uniform layer. The print and the primer will be described in more detail with reference to FIGS. 3a-c.

The floor panel 1 is provided with a mechanical locking system for locking the floor panel 1 to adjacent floor panels horizontally and/or vertically. The mechanical locking system comprises at a first edge of the floor panel a tongue groove 16 adapted to receive a tongue 15 of an adjacent floor panel, and a locking strip 12 provided with a locking element 13 adapted to cooperate with a locking groove 14 of an adjacent floor panel and lock the floor panel 1 in a horizontal direction to the adjacent floor panel. The mechanical locking system further comprises at a second edge a locking groove 14 adapted to receive a locking element 13 of an adjacent floor panel, and a tongue 15 adapted cooperate with a tongue groove 16 of an adjacent floor panel and lock the panel 1 in a vertical direction. The mechanical locking system is formed in the core 2 of the floor panel 1. Both long side edges and short side edges of the floor panel 1 may be provided with a mechanical locking system. Alternatively, long side edges of the floor panel 1 may be provided with the mechanical locking system for horizontally and vertically locking, and the short side edges may be provided with a mechanical locking system for horizontally locking only. It is also contemplated that other locking systems may be used, for example of the type described in WO2007/015669.

In FIG. 2a, the carrier 3 is provided with the print 10 on its upper surface facing away from the core 2.

Figure 2B:
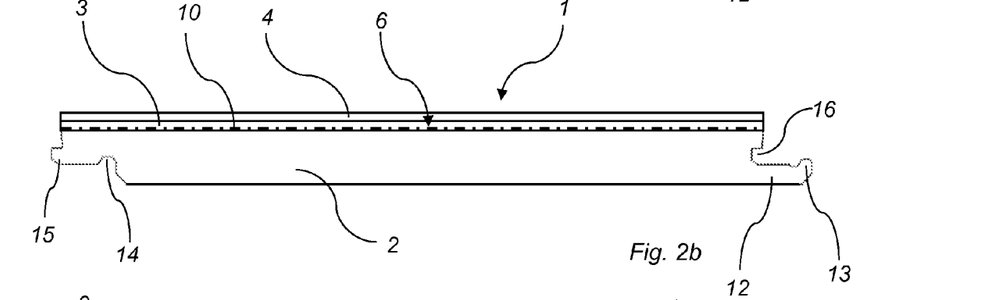
FIG. 2b illustrates a cross-section of an embodiment of a building panel such as a floor panel.

In FIG. 2b, the carrier 3 is provided with the print 10 on its lower surface facing the core 2. In this embodiment, the protective layer 4 and/or the coating 5 may be excluded. In the shown embodiment, a protective layer 4 is arranged over the carrier 3 forming the décor layer 6 and the coating 5 is excluded. In the embodiment shown in FIG. 2b, the floor panel 1 comprises a core 2 of the type described above with reference to FIG. 1 and FIG. 2a and a carrier 3 of the type described above with reference to FIG. 1a. In all other aspects, the floor panel 1 corresponds to the floor panel 1 described with reference to FIG. 1 and FIG. 2a.

Figure 2C:
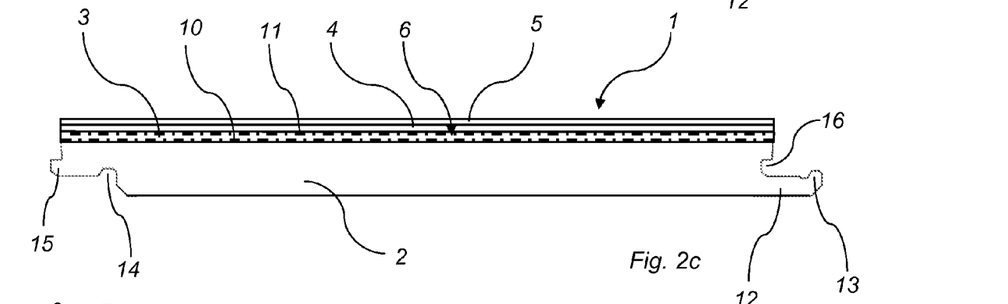
FIG. 2c illustrates a cross-section of an embodiment of a building panel such as a floor panel.

In FIG. 2c, the carrier 3 is provided with two prints 10, 11 of the above described type. A first print 10 is printed on a first surface of the carrier 3 facing the core 2. A second print 11 is printed on a second surface of the carrier 3 facing away from the core 2. The first and the second print 10, 11 may be the same pattern or design. As an alternative, the first and second print 10, 11 may differ. As another alternative, the first and the second print 10, 11 may be similar pattern or design. A protective layer 4 is arranged on the carrier 3. A coating 5 may be applied on top of the protective layer 4. The floor panel 1 in FIG. 2c comprises a core 2, carrier 3 and protective layer 4 of the type described above with reference to FIG. 1 and FIG. 2a. In all other aspect, the floor panel 1 corresponds to the floor panel 1 described with reference to FIG. 1 and FIG. 2a.

Figure 2D:
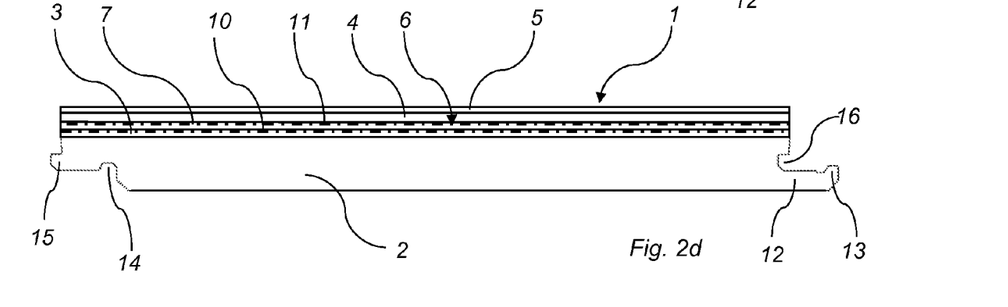
FIG. 2d illustrates a cross-section of an embodiment of a building panel such as a floor panel.

In FIG. 2d, an additional carrier 7 is arranged on the carrier 3. A first print 10 is printed on the carrier 3, preferably on an upper surface of the carrier 3 facing away from the core 2. A second print 11 is printed on the additional carrier 7, preferably on an upper surface of the additional carrier 7 facing away from the core 2. By printing on two layers, advanced designs of the print may be obtained. The first and the second print 10, 11 may be the same pattern or design. As an alternative, the first and second print 10, 11 may differ. As another alternative, the first and the second print 10, 11 may be similar pattern or design. Preferably, a protective layer 4 is arranged on the additional carrier 7. A coating 5 may be applied on top of the protective layer 4. The additional carrier 7 is of the same type as the carrier 3.

Alternatively, the second print 11 is printed on a lower surface of the additional carrier 7. In this embodiment, the protective layer 4 and/or the coating 5 can be excluded. Thus, the additional carrier 7 also has the function of a protective layer.

In all other aspects, such as for example the composition of the core 2, carrier 3, protective layer 4 and coating 5, the floor panel 1 corresponds to the floor panel 1 described with reference to FIG. 1 and FIG. 2a.

A method of producing a building panel such as a floor panel 1 according to an embodiment of the invention, and especially printing a decorative design, will now be described with reference to FIGS. 3a, 3b and 3c. A carrier 3, in form of a foil or film, for forming the décor layer 6 of the above described type is provided. The carrier comprises a thermoplastic material such as polyvinyl chloride (PVC), polyester, polypropylene (PP), polyethylene (PE), polystyrene (PS), polyurethane (PUR), polyethylene terephthalate (PET), polyacrylate, polyvinyl butyral, or a combination thereof. The carrier 3 is arranged on a roll 8.

A primer is applied on the first surface of the carrier 3. The primer is applied on the surface of the carrier 3 adapted to form the décor layer 6. The primer is applied on the carrier 3 by an applying device 20.

In one embodiment, the primer is an aqueous solution a salt, preferably at least one metal salt. The metal salt may be a monovalent metal salt, for example comprising a monovalent ion such as $Na+$. The metal salt may be a polyvalent metal salt. Preferably, the polyvalent metal salt comprises divalent ions such as $Ca^{2+}$, $Cu^{2+}$, $Ni^{2+}$, $Mg^{2+}$, $Zn^{2+}$, or $Ba^{2+}$, or trivalent ions such as $Al^{3+}$ or $Fe^{3+}$. The metal salt may for example be sodium chloride or calcium chloride. The metal salt crashes the ink composition resulting in precipitation of the pigment of the ink composition. The salt may also be a non-metal salt such as ammonium chloride.

The salt concentration of the primer may be at least 50% of the saturation point of the salt, preferably at least 70% of the saturation point of the salt, more preferably at least 90% of the saturation point of the salt. The primer may be a saturated solution, or a nearly saturated solution.

The primer may further comprise a wetting agent. The wetting agent increases wettability of the surface of the carrier 3. The wetting agent may be a non-ionic surfactant. The wetting agent may be a silicone surfactant, preferably a non-ionic silicone surfactant. The wetting agent may be a polyether modified siloxanes. The wetting agent may be a polyether modified polysiloxanes. The wetting agent may be a polyether modified polymethyl siloxane. As an alternative, the wetting agent may be a polydimethylsiloxane co-polymer. The primer may comprise 0.5-4% wt of the wetting agent, preferably 1-4% wt such as about 2% wt of the wetting agent.

The contact angle of the primer on the carrier may be of less than 50°, preferably less than 40°, more preferably less than 35°, such that about 30°

The primer is preferably homogenously applied to the surface of the carrier 3 such that a uniform layer of salt crystals is formed on the surface of the carrier 3. The wetting agent facilitates wetting of the surface by the carrier 3. The salt crystals are preferably uniformly distributed over the surface of the carrier. Preferably, the primer is coalescent and/or film forming.

The primer may further comprise a binder. The binder of the primer may differ from the binder of the ink composition.

Figure 3A:
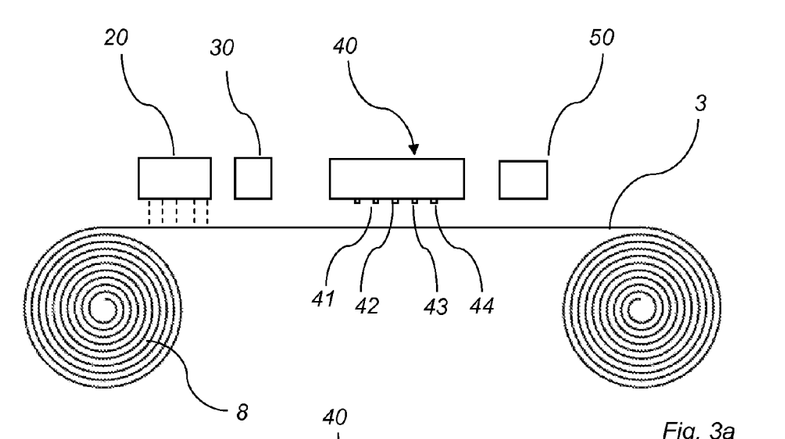
FIG. 3a illustrates a side view of a printing line.

The aqueous primer dispersion is applied by spraying by means of a spraying device 20 in the embodiment shown in FIG. 3a. Alternatively, the primer may be applied by digital printing, curtain coating, roller application, blasting, and by mechanical application.

The primer may form a layer coating the surface of the carrier 3, or the primer may only partly coat the surface of the carrier 3. By controlling the amount of the primer and on which parts of the carrier 3 the primer is applied, certain properties of the print can be controlled, for example bleeding of the ink, and the design of the print can be altered.

After the primer has been applied, the primer is dried in a heating device 30. Heat is applied to the surface of the carrier 3 adapted to form the décor layer 6 such that the applied primer dries. Heat may be applied in form of for instance infrared light (IR), near infrared light (NIR), heated air or a combination thereof. By drying the primer such that the aqueous parts of the primer evaporates, the risk is reduced that the ink applied during printing starts to bleed.

Evaporation of the water of the primer may be obtained at a quicker pace if the primer is heated before being applied to the surface of the carrier 3.

The carrier 3 may also be heated before and/or during the primer is applied in order to make the evaporation of the water of the primer faster. The heating of the carrier 3 may be achieved by arranging the carrier 3 on a heated plate.

In one embodiment, additional layers of the primer are applied to the surface of the carrier 3. The primer may be dried between each application step.

After the primer has been dried, the carrier 3 may be rolled on a roller for storage until printing, or may enter into a printing process.

Figure 3B:
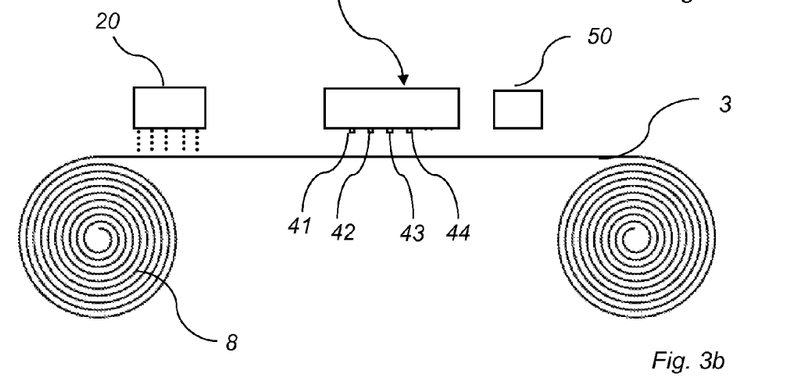
FIG. 3b illustrates a side view of an alternative printing line.

In another embodiment, which is shown in FIG. 3*b*, the primer comprises a salt applied on the surface of the carrier in solid form. The salt is applied by means of the applying device 20, preferably a scattering device. The salt is preferably at least one metal salt. The metal salt may be a monovalent metal salt, for example comprising a monovalent ion such as Na+. The metal salt may be a polyvalent metal salt. Preferably, the polyvalent metal salt comprises divalent ions such as $Ca^{2+}$, $Cu^{2+}$, $Ni^{2+}$, $Mg^{2+}$, $Zn^{2+}$, or $Ba^{2+}$, or trivalent ions such as $Al^{3+}$ or $Fe^{3+}$. The metal salt may for example be sodium chloride or calcium chloride. The metal salt crashes the ink composition resulting in precipitation of the pigment of the ink composition.

The salt crystals forming the primer are preferably uniformly distributed over the surface of the carrier 3. The salt crystals form preferably a uniform layer on the surface of the carrier 3.

The primer comprising the salt in solid form may be bonded to the surface of the carrier 3 in several ways. In one embodiment, the carrier 3 is heated before and/or during the primer is applied such that the salt binds to the carrier. In one embodiment, the carrier 3 is electrically charged such that the carrier attracts the salt crystals of the primer. In one embodiment, a plasticizer is applied on the surface of the carrier 3 such that the salt crystals are bonded to the plasticized surface of the carrier 3. Alternatively, a solvent may be applied to the surface of the carrier 3. In one embodiment, the salt crystals are mechanically attached to the surface of the carrier 3, for example by making the surface of the carrier 3 porous.

It is also contemplated that a combined pre-treatment may be used. In alternative embodiment, the pre-treatment comprises applying a Corona, flaming or plasma treatment on the first surface of the carrier 3 prior to printing. The Corona, flaming or plasma treatment increases the wettability of the surface. Thereafter, a primer of any of the above described type is applied to the treated surface. The primer is subsequently dried before enter the printing process. As described above, the carrier 3 is either rolled on roller or enters into a printing process.

Figure 3C:
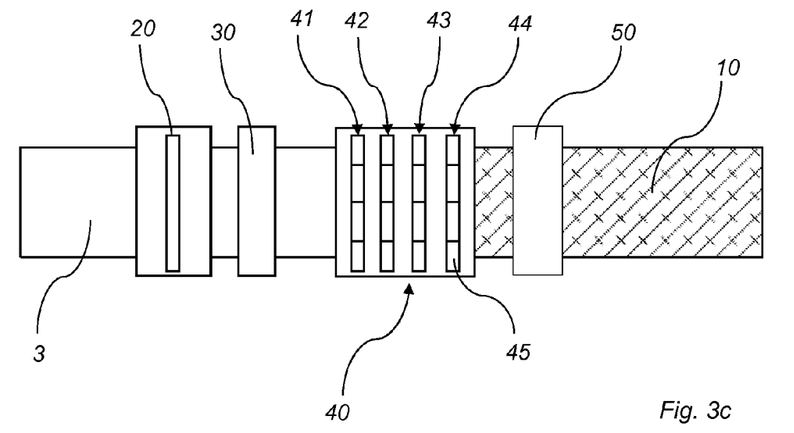

In the embodiment shown in FIGS. 3*a*, 3*b* and 3*c*, the carrier 3 enters into a printing process after the primer has been applied. In the embodiment shown in FIG. 3*a*, the carrier 3 enters the printing process after the step of drying the primer. In the printing process, which is similar for both the embodiment shown in FIGS. 3*a* and 3*b*, a print 6 by digital printing is printed to the pre-treated surface of the carrier 3 adapted to form the décor layer 6 of the floor panel 1.

The printer 40 is preferably an inkjet printer. Preferably, the printer 40 is a DOD (Drop on Demand) piezo-electric inkjet printer. A thermal DOD inkjet printer may also be used. The print 6 is applied in a contactless manner.

The printer 40 comprises at least one inkjet print head 45. Preferably, the printer 40 comprises several inkjet print heads 45. CMYK colours or spot colours may be used. If CMYK is used as a colour system, at least four inkjet print heads 45 is required, one for every colour. If spot colours are used, one print head 45 is required for each spot colour. The number of spot colours and thereby the number of print heads 45 may vary. The printer 40 shown in FIGS. 3*a* and 3*b* comprises four print heads 45, corresponding to CMYK-colours or four spot colours.

Preferably, a number of print heads 45 are arranged one after in a row extending perpendicular to the conveying direction of the carrier 3 through printer. Print heads arranged in the same row includes ink having the same colour. The width of the row of print heads preferably corresponds to the width of the carrier 3 on which the print 6 is to be applied.

In the shown digital printer 40, a first, second, third and fourth row 41, 42, 43, 44 of print heads are arranged one after each other in the conveying direction D of the carrier. A first colour is applied by the print heads in the first row 41, a second colour is applied by the print heads in the second row 42, a third colour is applied by the print heads in the third row 43 and a fourth colour is applied by the print heads in the fourth row 44.

Alternatively, a printer 40 comprising a print head having different channels may be used. In this case, one print head may print one colour or several colours. Thereby, more than one colour can be printed by an individual print head provided with different channels. One channel is provided for each colour. Consequently, only one row of print heads may be provided in the printer.

The ink that is applied by means of the above described inkjet printer 40 is an aqueous pigment ink composition. The ink composition comprises pigments giving the ink its specific colour. Preferably, the aqueous ink composition is a heat activated curing ink. The ink composition may comprise a binder, water and pigment. The binder may for example be a polymer or cellulose. The binder may be dispersed in the ink composition. Alternatively, the pigment is coated by a binder, preferably a polymer. The polymer may carry carboxyl groups. The polymer may be styrene, acrylic or methacrylic polymer or copolymer, or unsaturated monomers, polyesters, vinyl polymers or copolymers, aromatic and aliphatic polyurethanes, or alkyd resins.

The decorative design that is to be printed on the carrier 3 adapted to form the décor layer 6 may be both natural designs and patterns such as a wood pattern or stone pattern. The decorative design may also be a fantasy design or pattern.

The inkjet printer 40 prints a print 10 in form of a decorative design on the primer applied on the surface of the carrier 3 adapted to form the décor layer 6.

Heat is applied to the print such that the water of the aqueous pigment ink composition evaporates. A heating device 50 may be arranged after the digital printer 40, as seen in the conveying direction D of the carrier. The heating device 50 may include infrared (IR) heating, near infrared (NIR) heating, heated air or a combination thereof.

If the printing is made in an offline process, the carrier 3 may be rolled on a roller 8 in order to be stored when the print 6 has dried. It is also contemplated that the printing takes place inline.

In one embodiment, the carrier 3 is printed on one surface only. In an alternative embodiment, the carrier 3 is printed on both surfaces. In that embodiment, a primer as described above is applied to the first surface of the carrier 3, the first surface is printed, a primer as described above is applied to the second surface of the carrier 3, and the second surface is printed. As an alternative, pre-treatment of both surfaces of the carrier 3 takes place before printing on both surfaces of the carrier 3.

The carrier 3 for forming the décor layer 6 may be cut or punched into a size corresponding to a size of a floor panel 1. Also a film or foil adapted to form the protective layer 4 may be cut or punched into a size corresponding to a size of a floor panel 1 The protective layer 4 comprises a thermoplastic material such as such as polyvinyl chloride (PVC), polyester, polypropylene (PP), polyethylene (PE), polystyrene (PS), polyurethane (PUR), polyethylene terephthalate (PET), polyacrylate, polyvinyl butyral, or a combination thereof. Core material adapted to form the core 2 may be also cut or punched into a size corresponding to a size of a floor panel 1. The core may comprise polyvinyl chloride (PVC) or polypropylene (PP) or be a WPC. Alternatively, the décor layer and/or the protective layer are provided on rollers to be bonded together in a continuous process.

Figure 4:
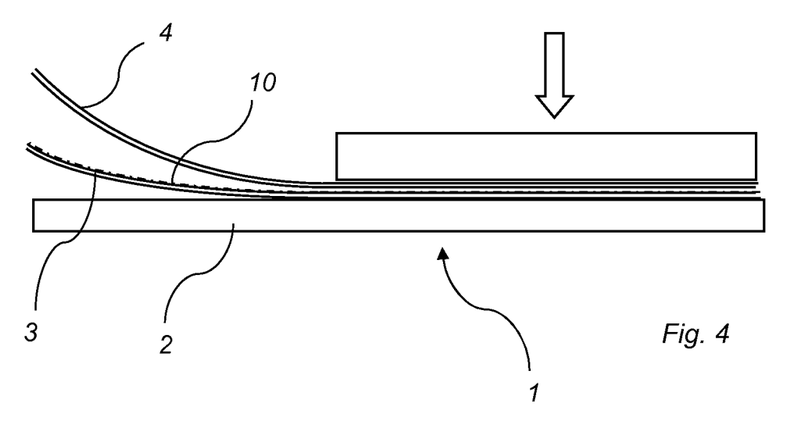
FIG. 4 illustrates bonding of layers for forming a building panel.

As shown in FIG. 4, the printed carrier 3 is arranged on a core 2 comprising at least a layer of thermoplastic material to form a décor layer 6. The print 10 may be facing the core 2 or may be facing away from the core 2. If more than one carrier 3, 7 are provided, the carriers 3, 7 are arranged on top of each other to form the décor layer 6. A protective layer 4 is arranged on the printed carrier 3 forming the décor layer 6. The core 2, the printed carrier 3 adapted to form the décor layer 6, and the protective layer 4 are pressed together to form a floor panel 1. An embossed press plate may be used to form an embossed surface of the floor panel 1. Heat and pressure may be used to press the layers together. The temperature may be 120-200° C. The pressure may be 5-10 bar. The carrier 3 provided with the print is bonded to the protective layer 4. The print is located between the carrier 3 and the protective layer 4 being bonded together. The carrier 3 is also bonded to the core 2.

A coating 5, for example a radiation curing coating, preferably a UV curing coating, may be applied to the protective layer 4 after pressing. The coating 5 may comprise an acrylate oligomer, methacrylate oligomer, or unsaturated polyester.

Figure 5:
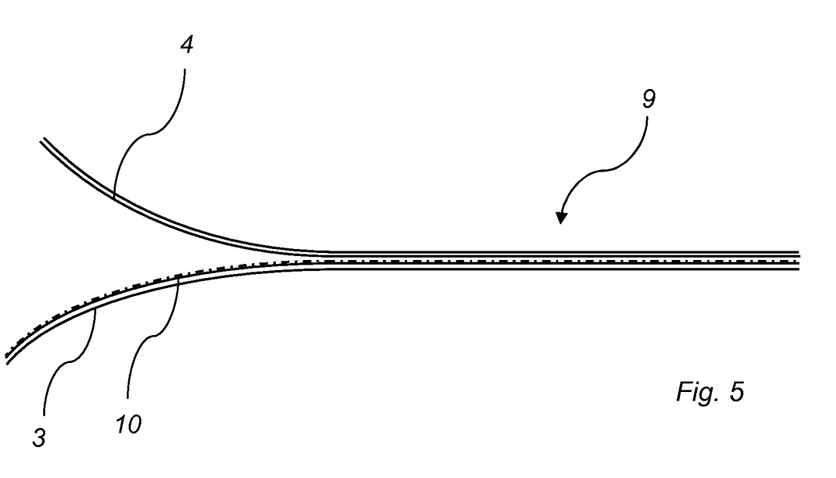
FIG. 5 illustrates a decorative substrate.

The floor panel 1 may be further divided into floor panels or floorboards. A mechanical locking system of the above described type may be formed at at least one edge of the floor panel. In one embodiment, which is shown in FIG. 5, the printed carrier 3 is bonded to the protective layer 4 by pressing them together to form a decorative substrate 9. Heat and pressure may be used to press the layers together. The print is located between the carrier 3 and the protective 4 being bonded together. The decorative substrate 9 may be bonded by pressing to a core of any type in a subsequent step, or simultaneously as bonding the printed carrier 3 to the protective layer 4.

The core may comprise a thermoplastic material, or at least a layer comprising a thermoplastic material, or may be a wood-based material.

The decorative substrate 9 comprising the printed carrier and the protective layer may be stored on, for example, a roller, and later be adhered to a core. The core may comprise other materials than a thermoplastic material.

The decorative substrate forms a printed, thermoplastic laminate.

It is contemplated that there are numerous modifications of the embodiments described herein, which are still within the scope of the invention as defined by the appended claims.

It is for example contemplated that a panel as described above may not only be a floor panel, but may also be a building panel such as ceiling panel, a wall panel, a furniture component etc.

It is also contemplated that the printing and primer application steps may be performed in an inline process or in an offline process.

It is contemplated that the printing may be performed by rotogravure printing, screen printing etc. as alternative to digital printing.

It is also contemplated that drying of the primer may be excluded, depending on the properties of the primer. When using certain kinds of primers, it is possible to print as described above in a primer that has not yet dried.

It is further contemplated that a layer may be arranged between the carrier forming the décor layer and the core. As an example, a layer having a uniform colour may be arranged between the carrier and the core.

EXAMPLES

Reference Example

A white, PVC foil for LVT was printed directly on by means of a digital printer with a water based ink. The print was dried in 60° C. during 10 min. The printed foil was bonded to a transparent protective foil of PVC for LVT in a hot/cold-pressing step at 185° C. for 70 seconds at approximately 6 bar pressure, followed by cooling down to 25° C. at approximately 5 bar pressure. The bonding between the printed PVC foil and the protective foil was good.

The resulting print is of poor quality due to the difference in surface tension between the ink and the LVT-foil. The ink drops have agglomerated to large ink drops. The ink drops have started to bleed into each other.

Example 1

A white, PVC foil for LVT was treated with a primer comprising 30 g/100 ml of NaCl dissolved in deionized water, corresponding to 84% of the saturation point for NaCl in water. The foil was dried before further steps. The contact angle of the primer on the PVC foil was measured to about 90°.

The foil treated with the primer was printed by means of a digital printer with a water based ink . The print was dried in 60° C. during 10 min. The printed foil was bonded to a transparent protective foil of PVC for LVT in a hot/cold-pressing step at 185° C. for 70 seconds at approximately 6 bar pressure, followed by cooling down to 25° C. at approximately 5 bar pressure. The bonding between the printed PVC foil and the protective foil was good.

It was not possible to apply the primer evenly over the surface of the foil due to the difference in surface tension between the primer and the LVT-foil. The printed image is not fixated evenly due to the poor application of the primer.

Example 2

A white, PVC foil for LVT was treated with a primer comprising 30 g/100 ml of NaCl dissolved in deionized water, corresponding to 84% of the saturation point for NaCl in water. 2.0 weight-% of BYK 345 as a wetting agent was added to the primer solution. The contact angle of the primer on the PVC foil was measured as less than 40°. The foil was dried before further steps.

The foil treated with the primer was printed by means of a digital printer with a water based ink. The print was dried in 60° C. during 10 min. The printed foil was bonded to a transparent protective foil of PVC for LVT in a hot/cold-pressing step at 185° C. for 70 seconds at approximately 6 bar pressure, followed by cooling down to 25° C. at approximately 5 bar pressure. The bonding between the printed PVC foil and the protective foil was good.

The primer was evenly applied over the surface on the LVT-foil. The printed image was not fixated evenly due to insufficient concentration of NaCl in the primer.

Example 3

A white, PVC foil for LVT was treated with a primer comprising 35 g/100 ml of NaCl dissolved in deionized water, corresponding to 97% of the saturation point for NaCl in water. 2.0 weight-% of BYK 345 as a wetting agent was added to the primer solution. The contact angle of the primer on the PVC foil was measured as less than 40°. The foil was dried before further steps.

The foil treated with the primer was printed by means of a digital printer with a water based ink. The print was dried in 60° C. during 10 min. The printed foil was bonded to a transparent protective foil of PVC for LVT in a hot/cold-pressing step at 185° C. for 70 seconds at approximately 6 bar pressure, followed by cooling down to 25° C. at approximately 5 bar pressure. The bonding between the printed PVC foil and the protective foil was good.

The primer is evenly applied over the surface on the LVT-foil. The printed image is fixated evenly over the surface of the foil and a print result with good colour strength and resolution is achieved.

The amount of wetting agent applied in the above examples is adapted to the foil used, and to the surface tension of the foil, in the examples, and may be different when using a different substrate and/or different wetting agent.

The amount of salt applied in the above examples is adapted to the ink used in the examples, and may be different when using a different ink and/or different type of salt.

The invention claimed is:
1. Method of producing a building panel, comprising
providing a carrier comprising a thermoplastic material,
applying a primer comprising at least one salt on a first surface of the carrier,
printing by means of digital printing a first print on said first surface of the carrier with an aqueous pigment ink composition, and
applying a protective layer on said first surface of the carrier and applying the carrier on a core, and
pressing, by applying heat and pressure, the protective layer, the carrier, and the core together to form a building panel,
wherein the primer possesses a salt concentration of at least 50% of a saturation point of the salt.
2. Method according to claim 1, wherein the primer is an aqueous solution comprising said salt.
3. Method according to claim 1, wherein the primer further comprises a wetting agent.
4. Method according to claim 1, wherein the primer is applied by means of digital printing.
5. Method according to claim 1, further comprising drying the primer applied on the first surface of the carrier prior to printing said first print.
6. Method according to claim 1, wherein the aqueous pigment ink composition is a heat activated curing ink.
7. Method according to claim 1, wherein the aqueous pigment ink composition comprises a binder, water and a pigment.
8. Method according to claim 1, further comprising applying heat to the print.
9. Method according to claim 1, wherein the printing is made by an inkjet printer.
10. Method according to claim 1, wherein the thermoplastic material of the carrier is polyvinyl chloride (PVC), polyester, polypropylene (PP), polyethylene (PE), polystyrene (PS), polyurethane (PUR), or polyethylene terephthalate (PET).
11. Method according to claim 1, wherein the protective layer comprises a thermoplastic material.
12. Method for forming a decorative substrate, comprising
providing a carrier comprising a thermoplastic material,
applying a primer comprising at least one salt on a first surface of the carrier,
printing by means of digital printing a first print on said first surface of the carrier with an aqueous pigment ink composition,
applying a protective layer comprising a thermoplastic material on the first surface of the carrier,
pressing, by applying heat and pressure, the protective layer and the carrier together to form a decorative substrate,
wherein the primer possesses a salt concentration of at least 50% of a saturation point of the salt.
13. Method according to claim 12, wherein the primer is an aqueous solution comprising said salt.
14. Method according to claim 12, further comprising a wetting agent.
15. Method according to claim 12, wherein the primer is applied by means of digital printing.
16. Method according to claim 12, further comprising drying the primer applied on the first surface of the carrier prior to printing said first print.
17. Method according to claim 12, wherein the aqueous pigment ink composition is a heat activated curing ink.
18. Method according to claim 12, wherein the aqueous pigment ink composition comprises a binder, water and a pigment.
19. Method according to claim 12, further comprising applying heat to the print.
20. Method according to claim 12, wherein the printing is made by an inkjet printer.
21. Method according to claim 12, wherein thermoplastic material of the carrier is polyvinyl chloride (PVC), polyester, polypropylene (PP), polyethylene (PE), polystyrene (PS), polyurethane (PUR), or polyethylene terephthalate (PET).
22. Method according to claim 12, wherein the thermoplastic material of the protective layer is polyvinyl chloride (PVC), polyester, polypropylene (PP), polyethylene (PE), polystyrene (PS), polyurethane (PUR), or polyethylene terephthalate (PET).
23. Method of producing a building panel, comprising
providing a carrier comprising a thermoplastic material,
applying a primer comprising at least one salt on a first surface of the carrier,
printing by means of digital printing a first print on said first surface of the carrier with an aqueous pigment ink composition, and applying a protective layer on said first surface of the carrier and applying the carrier on a core, and pressing, by applying heat and pressure, the protective layer, the carrier, and the core together to form a building panel, wherein the salt is applied to the first surface of the carrier in solid form.

24. The method according to claim 1, wherein the primer is applied on the first surface of the carrier with a contact angle of less than 50°.

25. The method according to claim 1, wherein the salt is a monovalent metallic salt or a polyvalent metallic salt.

26. The method according to claim 1, wherein the salt is applied onto the first surface of the carrier by a scattering device.

27. Method for forming a decorative substrate, comprising providing a carrier comprising a thermoplastic material, applying a primer comprising at least one salt on a first surface of the carrier, printing by means of digital printing a first print on said first surface of the carrier with an aqueous pigment ink composition, applying a protective layer comprising a thermoplastic material on the first surface of the carrier, pressing, by applying heat and pressure, the protective layer and the carrier together to form a decorative substrate, wherein the salt is applied to the first surface of the carrier in solid form.

28. The method according to claim 12, wherein the primer is applied on the first surface of the carrier with a contact angle of less than 50°.

29. The method according to claim 12, wherein the salt is a monovalent metallic salt or a polyvalent metallic salt.

30. The method according to claim 12, wherein the salt is applied onto the first surface of the carrier by a scattering device.

\* \* \* \* \*